United States Patent
Gila et al.

(10) Patent No.: US 7,205,931 B2
(45) Date of Patent: Apr. 17, 2007

(54) METHOD FOR DETERMINING THE DISTANCE BETWEEN A BASE STATION AND A MOBILE OBJECT, IN ADDITION TO A BASE STATION AND IDENTIFICATION SYSTEM FOR A METHOD OF THIS TYPE

(75) Inventors: Janos Gila, Moedling (AT); Wolfgang Konrad, Moedling (AT); Alexander Renner, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 315 days.

(21) Appl. No.: 10/940,657

(22) Filed: Sep. 15, 2004

(65) Prior Publication Data

US 2005/0099333 A1 May 12, 2005

Related U.S. Application Data

(63) Continuation of application No. PCT/EP03/14014, filed on Dec. 10, 2003.

(30) Foreign Application Priority Data

Dec. 20, 2002 (DE) ................................ 102 61 098

(51) Int. Cl.
*G01S 13/38* (2006.01)

(52) U.S. Cl. ...................... 342/127; 342/125; 342/118; 342/194; 342/129

(58) Field of Classification Search ................. 342/127
See application file for complete search history.

(56) References Cited

U.S. PATENT DOCUMENTS 4,283,726 A * 8/1981 Spence et al. .............. 342/458

(Continued)

FOREIGN PATENT DOCUMENTS

| EP | 0 346 922 A2 | 12/1989 |
| EP | 0 933 648 A1 | 8/1999 |
| EP | 1 107 162 A1 | 6/2001 |

OTHER PUBLICATIONS

"ISO 18000-4/Mode t Air Interface—Mode 3: Semi-Passive Narrowband High Data-Rate RFID Sytem," ISO/IEC JTC 1/SC 31 WG4/SG3: project editor ISO 18000-4, Jul. 2, 2001, Version Rel.1.4, Siemena/Nedap.

(Continued)

*Primary Examiner*—Thomas H. Tarcza
*Assistant Examiner*—Matthew M Barker
(74) *Attorney, Agent, or Firm*—Sughrue Mion, PLLC

(57) ABSTRACT

A method for determining the distance between a base station (SLG) and a mobile object (DT1–DT3). A HF carrier frequency and an offset frequency (df) are predetermined for a QAM modulation. The HF carrier frequency is increased and decreased by the offset frequency in sequence over time in such a way that the HF carrier base frequencies (fo+df, fo–df) resulting in an HF carrier signal (TS) thus modulated exhibit an identical phase when the frequency is changed. The HF carrier signal is subsequently transmitted and simultaneously mixed (MIX) with an HF carrier signal (RS) that has been backscattered by the mobile object to obtain a carrier phase signal (PS). The corresponding carrier phase (PH1, PH2) for the two HF carrier base frequencies is determined in sequence over time. The difference (dPH) between these phases is used to calculate the distance between the base station and the respective mobile object.

19 Claims, 2 Drawing Sheets

U.S. PATENT DOCUMENTS

| | | | |
|---|---|---|---|
| 4,851,851 A * | 7/1989 | Hane | 342/112 |
| 5,298,904 A * | 3/1994 | Olich | 342/42 |
| 6,812,824 B1 * | 11/2004 | Goldinger et al. | 340/10.1 |
| 6,859,761 B2 * | 2/2005 | Bensky et al. | 702/189 |
| 6,868,073 B1 * | 3/2005 | Carrender | 370/278 |
| 7,024,331 B2 * | 4/2006 | Jones et al. | 702/150 |
| 2003/0020598 A1 * | 1/2003 | Albert et al. | 340/10.51 |
| 2003/0090365 A1 * | 5/2003 | Bergerhoff | 340/5.61 |

OTHER PUBLICATIONS

Jouko Vankka et al., "A Multicarrier QAM Modulator", IEEE Transactions on Circuits and Systems II, Analog and Digital Signal Processing, IEEE Inc., New York, pp. 1-10, vol. 47, No. 1, Jan. 2000.

* cited by examiner

METHOD FOR DETERMINING THE DISTANCE BETWEEN A BASE STATION AND A MOBILE OBJECT, IN ADDITION TO A BASE STATION AND IDENTIFICATION SYSTEM FOR A METHOD OF THIS TYPE

This is a Continuation of International Application PCT/EP03/014014, with an international filing date of Dec. 10, 2003, which was published under PCT Article 21(2) in German, and the disclosure of which is incorporated into this application by reference.

FIELD AND BACKGROUND OF THE INVENTION

The invention relates to a method for determining the distance between a base station and a mobile object. Further, the invention relates to such a method in an identification system having at least one mobile data memory which is attached to objects and acts as a mobile object for recording object-related status and/or process data. For example, the mobile object could be attached to objects in shipping, transport and/or production systems. The invention also relates to an identification system, a base station, etc., associated with such a method.

Methods for distance determination are known in the conventional art. For example, RADAR is a well known method for determining distances. From a stationary base station, radar waves are emitted and are backscattered by a mobile object, e.g., vehicles, persons, transponders, etc. To determine the distance, known modulation methods based on continuous sinusoidal signals (continuous wave) are preferably used, e.g., the FMCW, LFM or FSK modulation method. A common means to carry out the aforementioned modulation methods is the use of an IQ modulator (quadrature amplitude modulator). By measuring the carrier phase for different frequencies the distance of a mobile object can be measured. Further, similar techniques can be used to determine the speed of a mobile object located in the vicinity can then be determined.

Furthermore, identification systems are known, which have one or more stationary base stations (i.e. read/write devices) which exchange data with mobile data memories acting as mobile objects using a wireless mode of data transmission. The data is transmitted using a data transmission link which is typically radio-based. Systems of this type are used in technical installations in which a plurality of objects or goods must be moved as quickly and freely as possible. The objects that are moved and whose distance is determined can be of a wide variety of types. Examples of such objects are packages in a shipping installation, components in a production plant, luggage in a transport system, etc.

One example of an identification system of this type is described in the ISO 18000-4-MOD3 Standard entitled "Radio-frequency Identification Standard for Item Management—Air Interface." This standard provides that the read/write device polls for the presence of a mobile data memory within the detection range. For this purpose, it emits an unmodulated HF carrier signal with a defined HF carrier frequency, e.g., 2.45 GHz. A mobile data memory located in the vicinity can passively backscatter this carrier signal modulated with data to the read/write device. The read/write device then processes the received signal.

When operating two or more base station and/or mobile data memories are close to each other care must be taken to avoid undesirable interactions. This situation could occur, for example in adjacent assembly lines. The undesirable interactions could lead to overshoots between the individual base stations and the corresponding mobile data memories. The detection range of the corresponding base station must therefore be restricted. This can be accomplished, for example, by determining the distance between the base station and the corresponding mobile data memory.

Frequencies generated in a conventional manner to determine distances can be subject to significant measurement inaccuracies. This is because the zero phases of the frequencies generated in the base station are not correlated to each other. This is true, for example, if the corresponding frequencies come from different oscillators or are generated by a PLL (Phase Locked Loop). As a result, to get the desired correlation, the signal phases of each frequency must be measured at the transmitter. This requires additional complex circuitry.

OBJECTS OF THE INVENTION

One object of the invention is to provide an improved method for determining the distance between a base station and at least one mobile object. A further object of the invention is to provide a base station and an identification system for determining the distance between a base station and at least one mobile object.

SUMMARY OF THE INVENTION

To determine the distance between a base station and a mobile object in the method, according to one formulation of the invention, a HF carrier frequency and an offset frequency are predefined for an IQ modulation in the base station. The HF carrier frequency is sequentially increased and decreased by the offset frequency over time such that the HF carrier base frequencies resulting in a HF carrier signal thus modulated have the same phase when the frequency is changed. The HF carrier signal is subsequently transmitted and simultaneously mixed with an HF carrier signal that has been backscattered by the mobile object to obtain a carrier phase signal. The corresponding carrier phase for the two HF carrier base frequencies is determined sequentially over time and the difference between the phases is used to calculate the distance between the base station and the corresponding mobile object.

As a result, the phase of the two IQ—modulated HF carrier base frequencies in the HF carrier signal is identical in the base station. This has the advantage that the phase jumps, which usually occur when the frequency is changed, are avoided. An additional measurement on the transmitter in the base station and the required measuring time are advantageously eliminated.

According to an advantageous variant of the method, the HF carrier frequency and/or the offset frequency are changed between two distance determinations. Thus, if there is interference in one frequency band, it is possible to change to another frequency band. The frequency bands may correspond to different frequency channels.

According to another advantageous variant of the method, multiple distance determinations can be made with subsequent averaging over all the individual distance determinations.

This makes it possible to increase the measurement accuracy. The distance can thus be determined very precisely.

In one variant of the method, the base station is a read/write device and the mobile object is a mobile data memory. Matching their frequencies ensures good backscattering properties for determining the distance.

According to another advantageous variant of the method, the distance between the read/write device and the mobile data memory is measured in a transmission channel, particularly a transmission channel with four channels, such that signals of different frequencies are transmitted on the individual channels.

Advantageously, the method according to the invention is based on the transmission method defined in the ISO 18000-4-MOD3 Standard and adopts at least one of the channels thereof with modification.

If the ISO 18000-4-MOD3 Standard is adapted, the transmission channel can correspond to the ISO 18000-4-MOD3 notification channel. Where applicable, at least one channel of the communication channel according to the above standard can also be used for this purpose.

In the corresponding allocation, the channels of the transmission channel can be R2 channels in the notification channel of the ISO 18000-4-MOD-3 Standard.

The method can be advantageously used in an identification system with a base station and at least one mobile data memory that is attached to transported objects for recording object-specific status and/or process data.

According to the invention, the method can be carried out with a base station having at least one transceiver and one electronic signal processor. The transceiver has at least one digital IQ modulator, one transmit and receive antenna for transmitting and receiving the HF carrier signals and one mixer for the HF carrier signals to obtain the carrier phase signal, which the electronic signal processor uses to determine the distance between the base station and the mobile object.

An important advantage is that the carrier phase can be measured using existing circuit components, such as the PLL for HF carrier frequency modification and the IQ modulator for data modulation. As a result, the distance can be measured with sufficient accuracy without added complexity of electronic circuit components.

BRIEF DESCRIPTION OF THE DRAWINGS

The invention will now be described in greater detail with reference to the figures, in which.

DETAILED DESCRIPTION OF THE EMBODIMENTS

Figure 1:
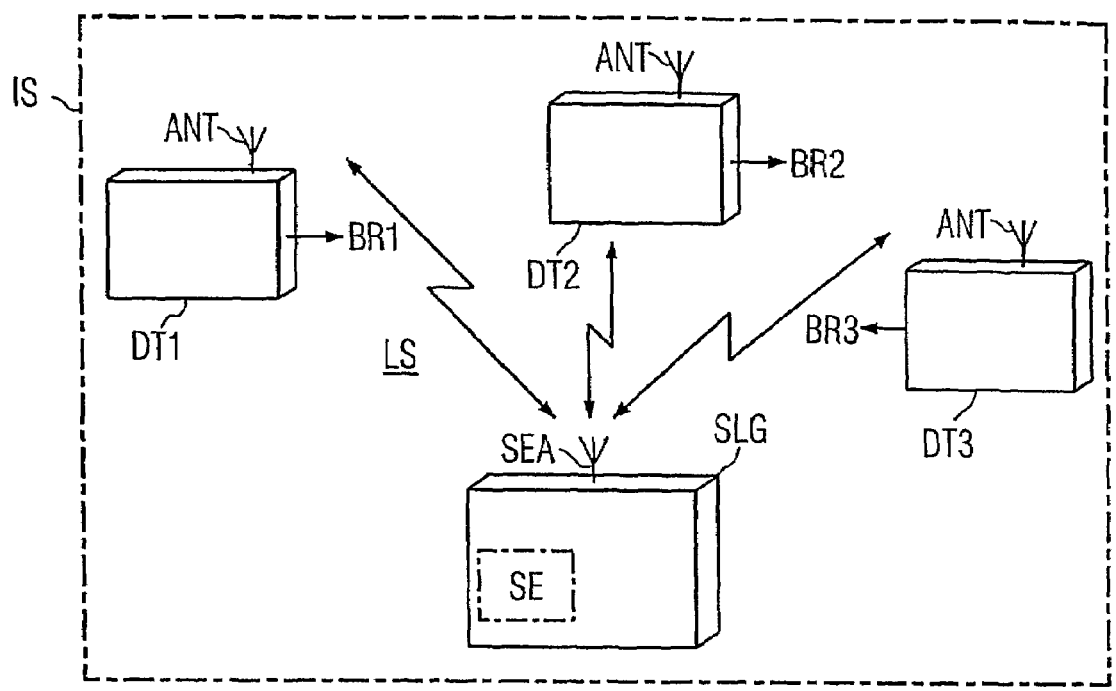
FIG. 1 shows an example of the use of a base station as a read/write device and a plurality of mobile data memories as exemplary mobile objects.

FIG. 1 shows an example of an identification system according to the present invention. The exemplary identification system includes a base station SLG (which can be a read/write device) and a plurality of mobile data memories DT1–DT3. An wireless interface LS is provided between the data memories DT1–DT3 and the base station SLG The mobile data memories DT1–DT3 each move in the direction shown. The different possible movement directions BR1–BR3 of the mobile data memories DT1–DT3 are shown in the figure by way of example.

The data memories DT1–DT3 and the base station SLG each have an antenna ANT, SEA, respectively for data communication there between. In the base station SLG, the dash-dotted rectangle indicates a transceiver SE, which is used to implement the method according to the invention.

Figure 2:
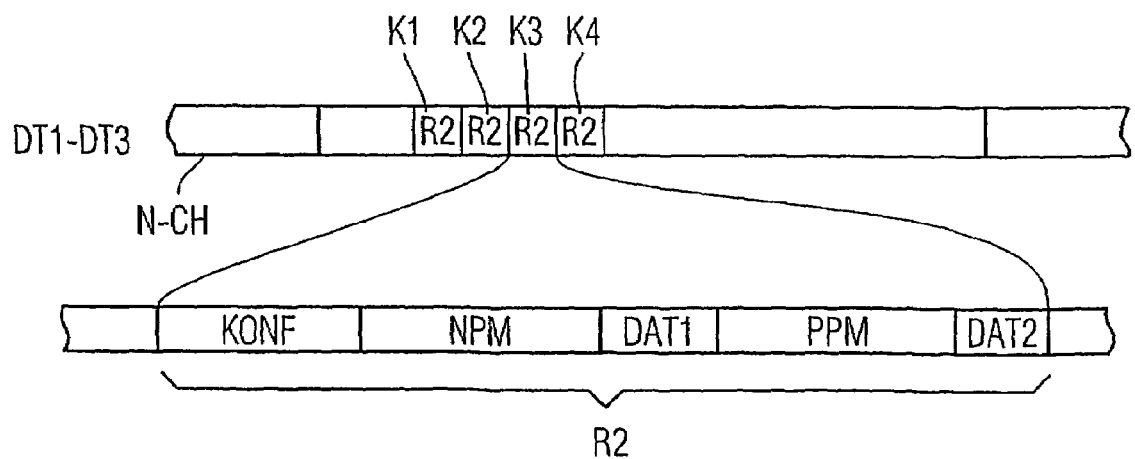
FIG. 2 shows an exemplary data structure of a transmission channel.

FIG. 2 shows an exemplary data structure corresponding to a transmission channel N-CH for communication between the mobile data memory DT1–DT3 and the read/write device SLG. The data structure of the transmission channel NCH is based on the notification channel of the ISO 18000-4 MOD3 Standard. To carry out one or more distance measurements, one or more of the sub-channels K1 to K4 are provided. These sub-channels K1 to K4, if based on the ISO 18000-4-MOD3 Standard, correspond to the R2-channels R2 in the notification channel of the ISO 18000-4-MOD3 Standard.

The figure depicts an exemplary substructure of an R2-channel R2 with five time blocks. In the first block KONF, the PLL is programmed to set the HF carrier frequency fo. In the following block NPM, a negative frequency jump to the lower HF carrier base frequency fo–df is set by the IQ modulator MOD. Thereafter, in the carrier phase signal PS, the first carrier phase PH1 and the corresponding measured data DAT1 are processed, e.g., by a digital signal processor (DSP). Subsequently, the positive frequency jump to the frequency fo+df occurs in the time block PPM, and the first measured data DAT1 together with the second measured data DAT2 are used to form the carrier phase difference dPH. For the above standard, a distance measurement in an R2-channel is possible within approximately 0.5 ms.

Figure 3:
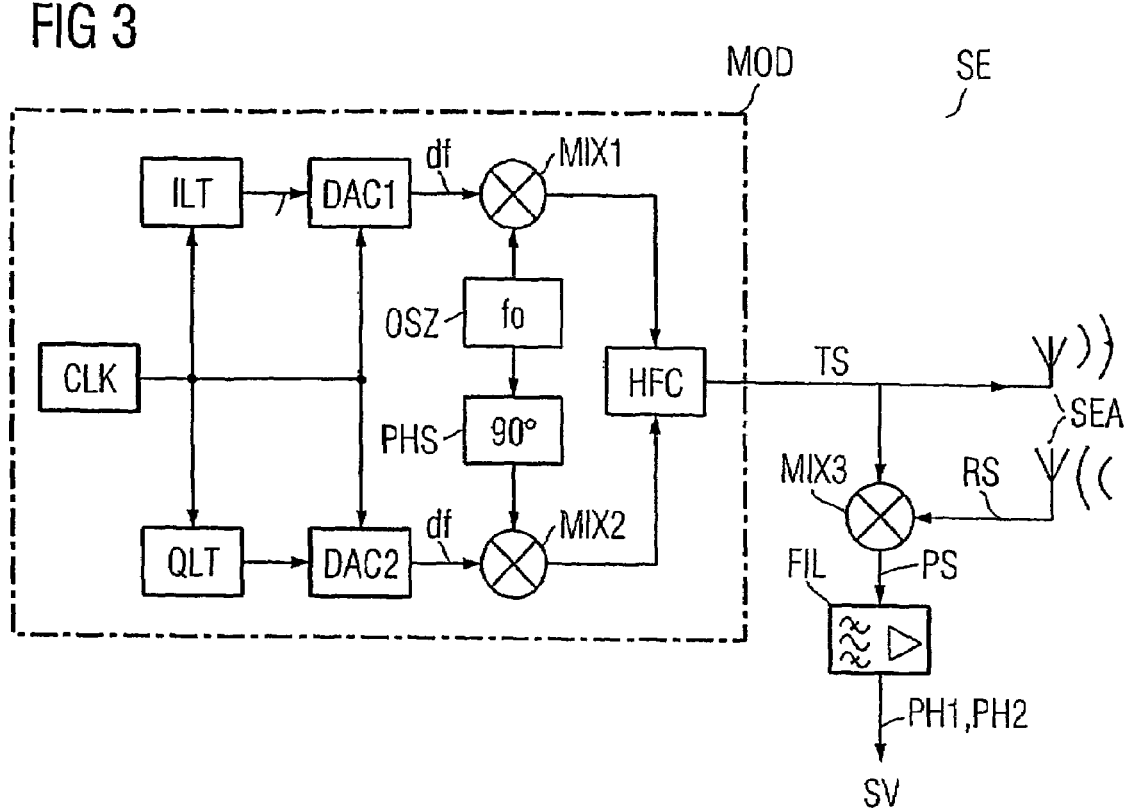
FIG. 3 shows an exemplary structure of a transceiver of a base station with an IQ modulator and a mixer for forming the carrier phase signal.

FIG. 3 shows an exemplary structure of a transceiver SE of a base station SLG with an IQ modulator MOD and a mixer MIX3 for forming the carrier phase signal PS. In the example illustrated in the figure, the IQ modulator MOD has two lookup tables ILT, QLT, which contain digital sampling values for the required signal waveform for the modulation. The sampling values are time-controlled via a clock generator CKL and are each supplied to a respective digital-to-analog converter DAC1, DAC2 where they are converted into analog signals. Oscillator OSZ provides a first signal with carrier frequency fo to the mixer MX1 to be mixed with df. Phase shifter PHS shifts the frequency of the first signal fo from OSZ to produce a second signal that has a frequency fo but is shifted by 90°. The second signal is provided to mixer MIX2 to be mixed with df. The two mixers MIX1, MIX2 modulate the two analog signals in quadrature.

Using an HF combiner HFC, the two mixed signals are combined into a HF carrier signal TS and fed to an antenna SEA for transmission. The mixer MIX3 then mixes a backscattered HF carrier signal RS (that has been backscattered by a mobile object DT1–DT3) together with the HF carrier signal TS. The output of the mixer MIX3 forms a carrier phase signal PS. Interfering frequency components (for example, lowpass components) are removed by a downstream filter FIL. The corresponding phase PH1, PH2 is then supplied to an electronic signal processor SV. The difference dPH is determined and the associated distance is calculated.

Figure 4:
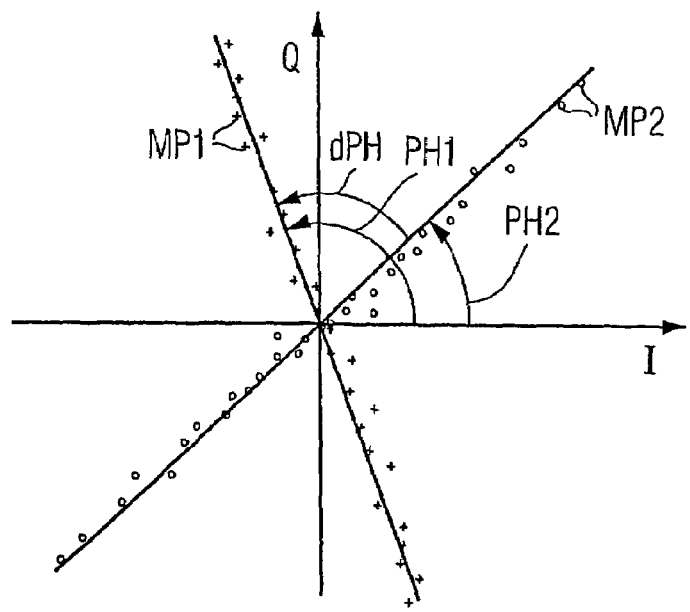
FIG. 4 shows an exemplary constellation diagram to graphically represent exemplary measuring points of the respective phase of each of two HF carrier base frequencies.

FIG. 4 shows an exemplary constellation diagram I, Q to graphically represent exemplary measuring points MP1, MP2 for determining the distance. Two measuring points each MP1, MP2 are entered for the corresponding phase PH1, PH2 of two HF carrier base frequencies fo+df, fo–df. The straight lines represent the exemplary averaging result for the phases PH1, PH2.

The above description of the preferred embodiments has been provided by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. Method for determining the distance between a base station and a mobile object, the method comprising:
   a) defining an HF carrier frequency and an offset frequency df for IQ modulation;
   b) sequentially increasing and decreasing the HF carrier frequency fo by the offset frequency df over time to generate two HF carrier base frequencies fo+df and fo−df that are modulated in a carrier signal such that the HF carrier base frequencies have identical phases;
   c) sequentially transmitting the HF carrier signal and mixing with a backscattered HF carrier signal to form a carrier phase signal;
   d) sequentially determining phases for the two HF carrier base frequencies fo+df and fo−df in the carrier phase signal over time, and
   e) using a difference between phases of the two carrier base frequencies fo+df and fo−df to determine the distance between the base station and the mobile object.

2. The method of claim 1, wherein the HF carrier frequency fo is changed between two distance determinations.

3. The method of claim 1, wherein the offset frequency df is changed between two distance determinations.

4. The method of claim 1, wherein multiple distance determinations are made and subsequently averaged.

5. The method of claim 1, wherein the base station is a read/write device and the mobile object is a mobile data memory.

6. The method of claim 5, wherein the distance is determined in a transmission channel between the read/write device and the mobile data memory.

7. The method of claim 6, wherein the transmission channel has a plurality of sub-channels.

8. The method of claim 6, wherein the transmission channel corresponds to a notification channel of the ISO 18000-4-MOD3 Standard.

9. The method of claim 8, wherein the sub-channels in the transmission channel correspond to R2-channels in the notification channel of the ISO 18000-4-MOD3 Standard.

10. An identification system comprising:
    a read-write device;
    a mobile data memory operable to be attached to a transported object to record at least one of object-specific status data and object-specific process data,
    the read-write device further including:
    a transceiver and an electronic signal processor,
    the transceiver further including:
    a digital IQ modulator,
    a transceiver antenna operable to transmit a carrier signal having a carrier frequency fo increased by an offset frequency df and additionally decreased by the offset frequency df such that the two frequencies fo+df and fo−df in the carrier signal have identical phases, the transceiver antenna further operable to receive a backscattered carrier signal, and
    a mixer operable to form a carrier phase signal by mixing the carrier signal and the backscattered carrier signal;
    an electronic signal processor operable to determine the distance between the base station and the mobile object using a phase difference between the two frequencies fo+df and fo−df in the carrier phase signal.

11. The system of claim 10, wherein the HF carrier frequency fo is changed between two distance determinations.

12. The system of claim 10, wherein the offset frequency df is changed between two distance determinations.

13. The system of claim 10, wherein multiple distance determinations are made and subsequently averaged.

14. The system of claim 10, wherein the read/write device is a stationary base station.

15. A base station comprising:
    a transceiver and
    an electronic signal processor,
    the transceiver further including:
    a digital IQ modulator,
    a transceiver antenna operable to transmit a carrier signal having a carrier frequency fo both increased by an offset frequency df and decreased by the offset df such that the two frequencies fo+df and fo−df in the carrier signal have identical phases, the transceiver antenna further operable to receive a backscattered carrier signal, and
    a mixer operable to form a carrier phase signal by mixing the carrier signal and the backscattered carrier signal;
    an electronic signal processor operable to determine the distance between the base station and a mobile object using a phase difference between the two frequencies fo+df and fo−df in the carrier phase signal.

16. The base station of claim 15, wherein the HF carrier frequency fo is changed between two distance determinations.

17. The base station of claim 15, wherein the offset frequency df is changed between two distance determinations.

18. The method of claim 15, wherein multiple distance determinations are made and subsequently averaged.

19. The base station of claim 1, wherein the base station is a read-write device.

* * * * *